United States Patent [19]

König

[11] Patent Number: 4,892,083
[45] Date of Patent: Jan. 9, 1990

[54] BAKING OVEN

[76] Inventor: Helmut König, Rotmoosweg 15, A-8045 Graz, Austria

[21] Appl. No.: 286,957
[22] PCT Filed: Apr. 15, 1987
[86] PCT No.: PCT/AT87/00027
    § 371 Date: Oct. 18, 1988
    § 102(e) Date: Oct. 18, 1988
[87] PCT Pub. No.: WO87/06100
    PCT Pub. Date: Oct. 22, 1987

[30] Foreign Application Priority Data

Apr. 18, 1986 [AT] Austria .................. 1037/86

[51] Int. Cl.⁴ .......................................... F24C 15/32
[52] U.S. Cl. ............................... 126/21 R; 126/20;
    432/200; 219/400; 34/191; 99/474; 99/443 R
[58] Field of Search ................. 126/19 R, 21 R, 21 A,
    126/2 D, 273 R; 34/191, 225; 432/200; 99/474,
    443, 447, 477, 443 R, 476; 219/388, 400

[56] References Cited

U.S. PATENT DOCUMENTS

| 3,861,378 | 1/1975 | Rhoads et al. ............... 219/400 |
| 4,032,289 | 6/1977 | Johnson et al. ............... 34/191 |
| 4,782,214 | 11/1988 | Voegtlin ..................... 219/401 |
| 4,785,151 | 11/1988 | Voegtlin ..................... 219/400 |

FOREIGN PATENT DOCUMENTS

| 26063 | 11/1975 | Austria . |
| 378469 | 12/1985 | Austria . |
| 2784 | 11/1979 | European Pat. Off. . |
| 2857125 | 2/1980 | Fed. Rep. of Germany . |
| 2483178 | 5/1981 | France . |
| 2535036 | 10/1982 | France . |
| 256443 | 10/1959 | Netherlands . |

Primary Examiner—James C. Yeung
Attorney, Agent, or Firm—Salter & Michaelson

[57] ABSTRACT

A baking oven has a baking chamber (2) which is at both of its sides separated from air channels (12) by partitions (11) being provided with air passage openings (30). The air channels (12) are connected to air supply channels (24) which are supplied with warm air by a blower (14) via a switching equipment (25) being centrally arranged relative to the cover wall (10) of the baking chamber (2), said switching equipment having preferably the shape of a flap (27) being swivellable around a horizontal axis. On account thereof, the baking chamber (2) is uniformly supplied with warm air which flows through the baking chamber (2) in horizontal and alternating direction (FIG. 1).

14 Claims, 2 Drawing Sheets

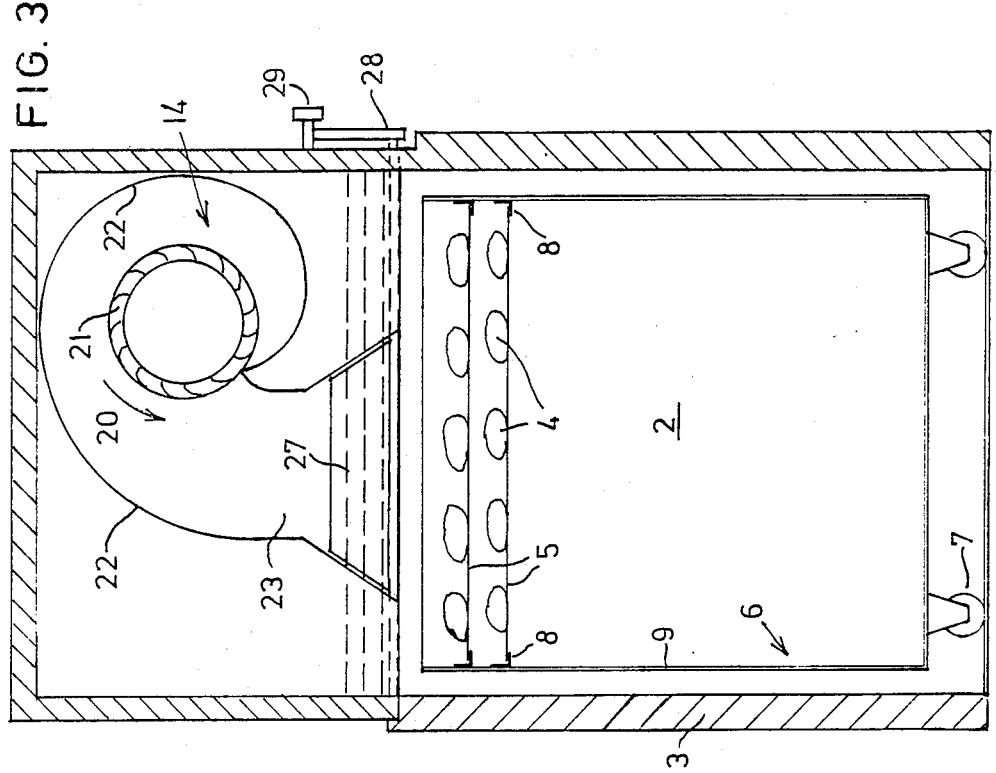
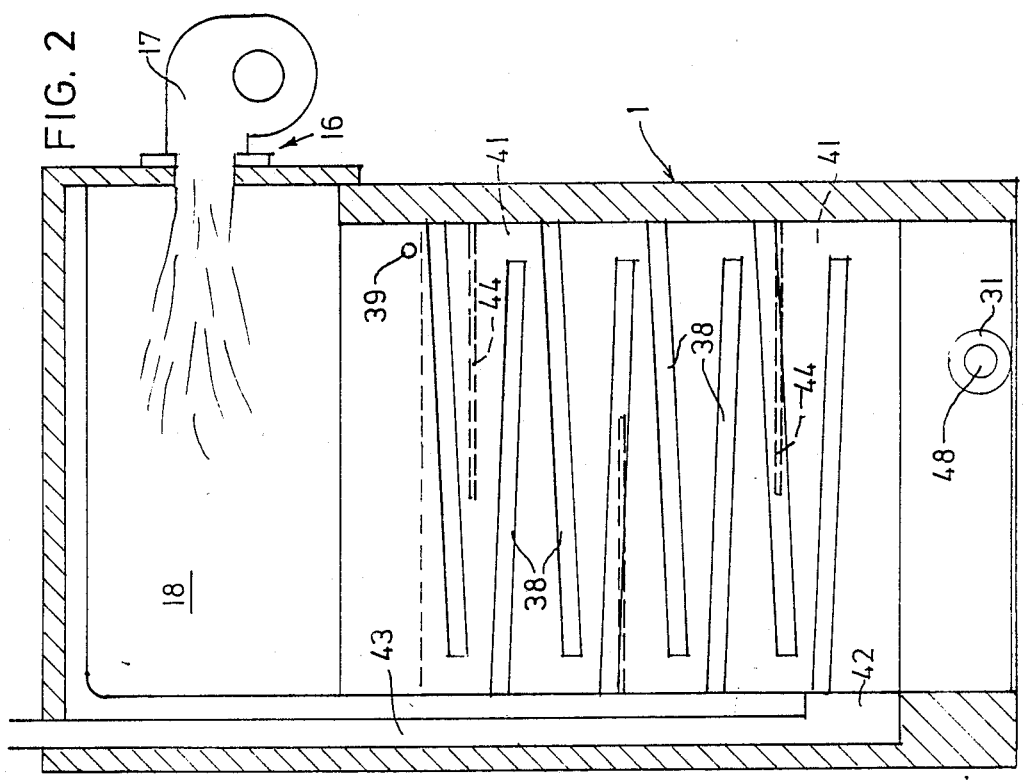

BAKING OVEN

The invention refers to a baking oven having a baking chamber being accessible via a door and being designed for introducing therein a carriage carrying the baking good and being stationary during the baking process, said baking oven comprising two air channels extending laterally of the baking chamber at both sides thereof over the effective height of the baking chamber and being each separated from the baking chamber by a partition provided with a plurality of air passage openings, said air channels being during the baking process alternately supplied by a blower and via a switching equipment with hot air being heated by a heating means and being humidified by a vapor supply means and transversely passing the baking chamber in alternating direction and being subsequently again sucked back along a closed circuit to the suction side of the blower, noting that the blower and the heating means are arranged at a higher level than the baking chamber and at least partially above said baking chamber and noting that the cover wall of the baking chamber is tightly closed.

In such a known construction (AT-PS No. 326 063), there is obtained the advantage of a small width of the baking oven and of a uniform gas flow through the baking chamber in a nearly horizontal direction. It is, however, disadvantageous that the flow resistances for both flow directions of the hot air stream are unequal and that considerable flow losses occur for at least one flow direction before hot air can arrive at the baking good. This may have a disadvantageous effect on sensible types of baking good.

From EP-A No. 2784 it is known to arrange for a baking oven, in which a vortex zone of the hot air is transversely moved through the baking oven in alternating direction, a switching equipment centrally above the baking chamber for the purpose of obtaining an equal air supply to two air channels vertically extending at both sides of the baking chamber. The drawbacks resulting from un equal flow resistances for both flow directions of the hot air stream are, however, not completely avoided in this construction, and further turbulences are introduced into the air stream to be fed into the baking chamber and a pressure drop is caused by a blower arranged downstream of the heating means.

It is an object of the invention to avoid these drawbacks and to provide for an equalized supply of warm air in both directions of the stream of warm air. This task is, according to the invention, solved in that the heating means is arranged at the suction side of the blower within the path of return flow of the hot air and in that a channel being directed against the cover wall of the baking chamber is connected to the pressure side of the blower and has its lower end located in the central area between said both air channels leading to two air supply channels extending above the cover wall of the baking chamber and being connected to said both air channels, noting that the switching equipment is arranged within this lower end of the channel between said both air supply channels. Thus, there result for both directions of the stream of warm air symmetric or nearly symmetric conditions and simultaneously there results a reduction of the flow resistances within that portion of the warm air circuit, through which the air must flow to arrive from the blower to the baking chamber. While in the construction according to the invention the air flows, for both flow directions, from the pressure side of the blower via the switching means and the respective air supply channel into the air channel connected to said channel and supplying the air into the baking chamber via openings of the partition, the air is, in the first described known construction, compelled to flow, for the one flow direction, from the pressure side of the blower via the heat exchanger into the air channel delimited by the partition. Because the heat exchanger must, for becoming effective, oppose to the air a considerable flow resistance. this means for this flow direction a drawback relative to the other air flow direction when considering inflow technique. As compared with the second mentioned known construction there results a substantial reduction of the pressure drop for the air propelled by the the blower and this for both glow directions of the hot air.

The arrangement of the heating means at the suction side of the blower within the path of return flow of the hot air is known per se in a construction of foreign type (AT-PS No. 378 469).

It is within the sense of the invention that the channel leading from the pressure side of the blower to the switching equipment and being directed against the cover wall of the basic chamber must be only very short length and may, if desired, also be formed of the pressure tube of the blower itself. In all of these cases there results, on account of the approximately symmetrical arrangement, the before-mentioned advantage of an equalized air flow combined with the advantage of a low constructional expenditure and of a space-saving construction, and this in particular if, according to a preferred embodiment. the switching equipment is formed of an air defelction flap being swivelable around a horizontal axis extending in direction of inserting the carriage, because, in this manner, separate deflection means for the air flowing from above to the respective air supply channel may be saved.

A substantial advantage resides also in that the construction according to the invention is independent from the manner in which the air is fed from the baking chamber back to the suction side of the blower. This recycling of the air can thus be adapted to the just existing conditions or desires, respectively. This is not the case in the initially described known construction, because recycling of the air must, in this construction, be effected via that air channel through which, at the moment, no air is supplied to the baking chamber.

In other known constructions, the switching equipment is formed of two throttle valves, which alternately become effective for one of both air channels and shut off the air supply into one of both air channels. This means an increased expenditure as compared with the construction according to the invention, because two flaps in place of one single flap. In addition, there result considerable pressure losses within the warm air flowing through the just active air channel on account of the fact that the warm air supplied by the blower hits the just closed throttle-valve with great velocity and must again flow back in opposite direction to the direction of supply for becoming effective for the baking chamber. These drawbacks are completely avoided in the subject of the invention.

According to a further development of the invention, the cross section of the channel is increased in direction to the cover wall of the baking chamber and the switching equipment is arranged at the location of the greatest cross section of this channel. Thus it becomes possible to use in the sense of the invention also such blower constructions, in which the pressure outlet does not extend over the whole active depth of the baking chamber, as this may, for example, be the case for a transverse-flow blower. On account of the mentioned enlargement of the channel cross section, a more narrow pressure tube of the blower is increased to the active depth of the baking chamber or to at least part thereof. In such a construction, the air deflection flap is, according to the invention, designed like a trapeze and swivelable about the broader basis edge of the trapeze. This results in a particularly simple construction of favourable costs.

According to the invention, the arrangement is preferably such that said both air supply channels are broadened in direction to the air channels. In this manner, it is possible—as already mentioned—to increase the flow cross section for the hot air supplied to the air channels up to the effective depth of these air channels (as measured in direction of introducing the carriage into the baking chamber). For the purpose of avoiding in this case any enlargement of the flow cross section for the air, which would result in pressure losses, the height of both air supply channels becomes, according to the invention, smaller in direction to the air channels, preferably on account of a bottom wall, being inclined relative to the air deflection flap, of both channels.

Although the construction of the invention has the advantage that only very view deflections are required for the warm air until this air arrives at the just active air channel, vortexes within the air stream are most frequently inavoidable already on account of the blower design. For the purpose of equalizing such turbulences within the incoming stream of hot air and for the purpose of obtaining an, as much as possible, uniform laminar supply of hot air into the just active channel, a device for equalizing the air flow is, according to a further development of the invention, provided at the area of transition of each air supply channel into the air channel, preferably within the area of the baking chamber corner. This device can, within the scope of the invention, be formed of several upright lamellae being parallelly arranged one relative to the other with their planes being oriented in direction of the air stream. The air is compelled to flow through the gaps remaining between these lamellae, whereby any irregularities within the air stream are suppressed. A particularly favourable construction results if, according to the invention, the lamellae are fixed to a tube extending in direction of introducing the carriage and simultaneously serving as a support member of the inclined bottom wall of the air supply channel. Although the invention is—as already mentioned—independent from the manner of recycling the air, it is, however, in many cases particularly favourable to provide in the inventive construction, for the purpose of sucking off the air having entered the baking chamber, an opening in the lower portion of the baking chamber, preferably at the lowermost location of the baking chamber, said opening having connected thereto a suction channel leading to the vapor supply means and then, via the heating means, to the blower.

In the drawing, the subject of the invention is schematically represented with reference to examples of embodiment.

FIG. 1 shows a vertical section through the baking oven.

The FIGS. 2 and 3 show sections along the lines II—II and III—III, respectively, of FIG. 1.

Figure 1:
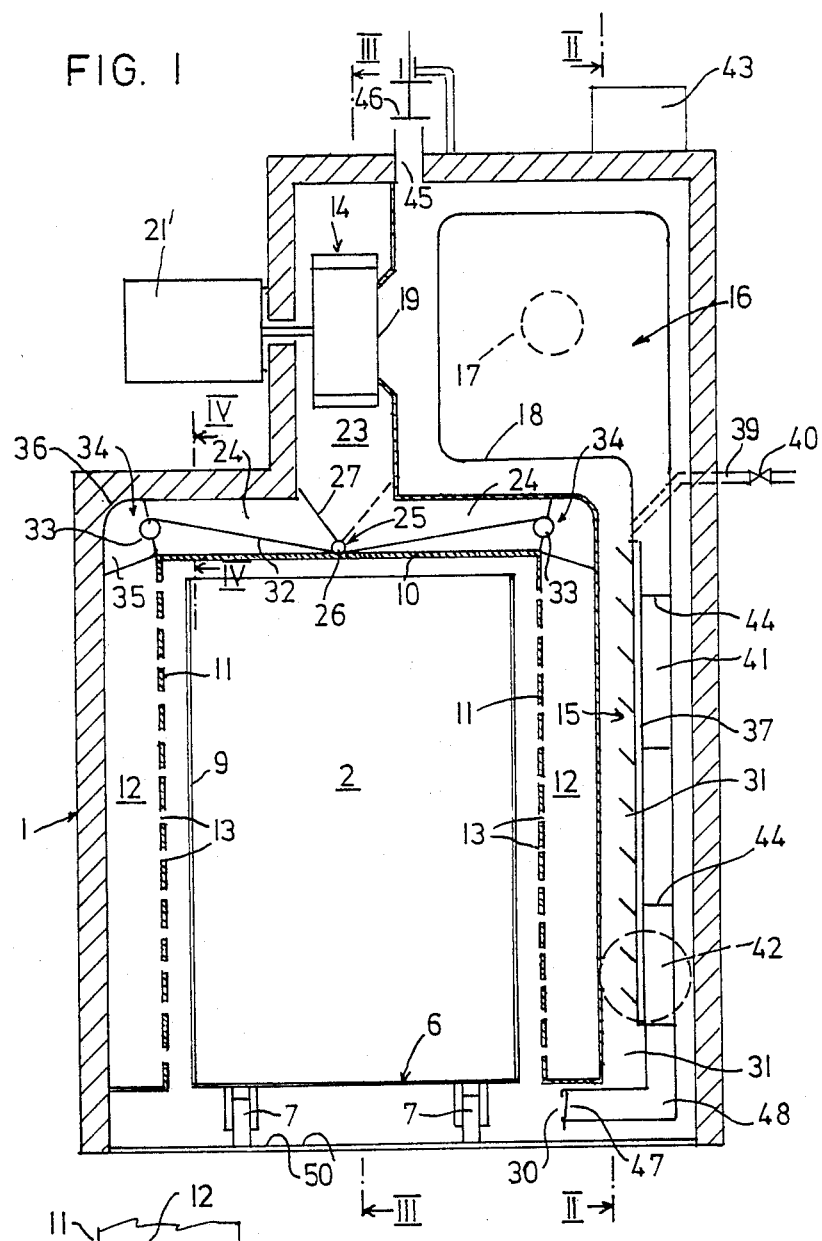

The baking oven according to FIG. 1 has a heat-insulating housing 1, in which is provided a walkable baking chamber 2, which is accessible via a door (FIG. 3) and into which can be rolled on wheels 7 a carriage 6 onto a bottom plate 5, said carriage 6 carrying the baking good 4 on support members 5, in particular baking plates. This carriage 6 can as a whole be moved out of the baking chamber 2, can be separated from the baking oven and can be interchanged against an other carriage. Each carriage 6 fits into the baking chamber 2 with small lateral play and upper play. The support members 5 rest on angle rails 8 being carried by lateral posts 9 of the carriage 6. The baking chamber 2 is airtightly closed at its upper side by a cover wall 10 and likewise at its rear wall, as seen in direction of introducing the carriage 6. Both side walls of the baking chamber 2 are limited over its effective height (i.e. that height over which support members 5 carrying the baking good 4 are arranged on the carriage 6) by partitions 11, behind which are located air channels 12 vertically extending over the whole effective height of the baking chamber 2 and having a depth, as measured in direction of introducing the carriage 6, being equal the depth, measured in the same direction, of the baking chamber 2. Air enters in alternating direction into the baking chamber 2 from these air channels and via air passage openings 13, which will later be described in greater detail. The air passage openings 13 are preferably small slots which extend over the depth of the baking chamber 2. Conveniently, the carriage 6 has the support members 5 arranged such that each support member is located at a somewhat higher level than one of the slot-shaped air passage openings 13. Somewhat below the respective opening 13, the carriage 6 has a horizontal baffle plate forming together with the support member located thereabove, a channel for the air being blown into the baking chamber 2 via the respective air passage opening 13, said channel forcing this air against the center of the carriage 6 or baking chamber 2, respectively. Such channels are described in the published international patent application WO 86/01077.

Hot, humid air is supplied to the air channels 12 arranged at both sides of the baking chamber 2 by a blower 14 being arranged above the baking chamber 2. The air sucked by this blower 14 is humidified by a vapor supply means 15 and is heated by a heating means 16. In the embodiment shown, the heating means 16 has an oil burner or gas burner 17 (FIG. 2) flanged to the top of the housing 1, the flame of this burner entering a flame tube 18 of a usual heat exchanger being flown around by the air sucked by the blower 14 via its suction tube 19 (FIG. 1). In place of such a burner 17 and of the associated flame tube 18 it is also possible to use an electrical heating radiator of usual design and consisting of several parallelly arranged heating rods being flown around by the air to be heated. The heating means 16 is located at least partially above the baking chamber 2 and said both air channels 12, respectively, and equally at least partially above the vapor supply means 15.

The air sucked by the blower 14 via its suction tube 19 is put into a vortex stream by the rotor 21 of the blower which is always rotated in the same direction (arrow 20, FIG. 3) by a motor 21' being flanged to the housing 1. The air is fed by the spiral-shaped mantle 22 of the blower 14 into a short vertical channel 23 formed of the outlet tube of the blower and being directed in vertical direction against the cover wall 10 of the baking chamber and is directed to the center of this cover wall 10. Air supply channels 24 extending above the cover wall 10 of the baking chamber 2 and being alternately supplied with hot air by a switching equipment 25 are branched off this channel 23 in direction to both sides of the baking oven and lead to the air channels 12. For this purpose, the switching equipment 25 has an air deflection flap 27 being swivellable around a horizontal axis 26 extending in direction of introducing the carriage 6, said air deflection flap being arranged at the entrance area of the channel 23 into said both air supply channels 24 such that it can be swiveled between two limit positions, one of which is shown in full lines in FIG. 1, whereas the other is shown in dashed lines. In the limit position shown in full lines, the air deflection flap 27 shuts the air supply channel 24 shown at the left-hand side of FIG. 1, whereas the air supply channel 24 shown at the right-hand side of FIG. 1 is shut in the other limit position. In each of both limit positions, the flap 27 formed of a plane plate is inclined for approximately 45°, so that the air coming through the vertical channel 23 is, as much as possible, smoothly deflected into the just active horizontal air supply channel 24. The cross section, of the channel 23 is, as seen in direction of introducing the carriage 6, increasing in direction from top to bottom, in particular in the area having arranged therein the flap 27 (FIG. 3), noting that this flap 27 has a trapezoidal shape and is swivellable about the broader basis edge of the trapeze. The axis 26 is designed as a shaft on which the flap 27 is rigidly mounted. This shaft extends out of the housing in a sealed manner and is connected with a lever 28 (FIG. 3), which is switched over by a geared motor 29 in rythmic intervals, for example in intervals of 30 seconds, so that the flap 27 is, in time intervals of 30 seconds, switched over into the respective other limit position and thus the flow direction of air within the baking chamber 2 is changed. The baking chamber 2 is flown through by the warm air in an approximately horizontal direction, said warm air being sucked out of the baking chamber 2 at the lowermost location thereof via a suction opening 30 and is supplied into a return channel 31, in which is arranged the vapor supply means 15 which is thus flown around by the air emerging from the baking chamber 2. From this location, the air flows back to the blower 14 via the heating means 16, so that there exists a closed circuit für the baking air.

Figure 4:
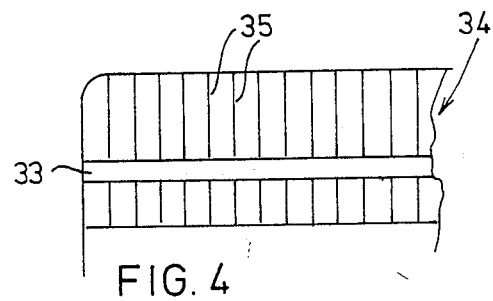
FIG. 4 is a section along line IV—IV of FIG. 1 in a larger scale.

The housing, which is formed of the mantle 22 of the blower 15 being formed of a circulating fan is helical in shape and has at its area of transition into the channel 23 a width corresponding only to a fraction of the depth of the baking oven. Also the channel 23 shall not be increased in its width to the total depth of the baking chamber if too great a pressure drop shall be prevented within this channel. To be in the position to uniformly supply with hot air the air channels 12 extending over the whole depth of the baking chamber, the width of each supply channel 24 is continuously enlarged in direction to the air channel 12 until it has attained at the area of transition into this air channel the whole depth of the baking chamber as measured in direction of insertion of the carriage 6. For the purpose of avoiding a strong pressure drop within the air supply channel 24, the bottom wall 32 of each air supply channel 24 is inclined relative to the axis 26, noting that the end, located at a higher level, of the bottom wall is supported on a horizontal tube 33. This tube 33 carries additionally a device 34 for equalizing the air flow and extending above the corner of the baking chamber. This device 34.has a plurality of vertical extending lamellae 35 (FIGS. 1, 4) being in parallel relation fixed on the tube 33 at equal distances one from the other and having their planes oriented in direction of the air flow. The outer edges of these lamellae 35 contact the rounded edges 36 of the housing 1. This device 34 forms a straightener for the air flow which substantially eliminates the vortex flow introduced into the air stream on account of the nozzle-like action of the air supply channel 24 and which simultaneously deflects the air into the correct direction, i.e. vertically downward. On account of this arrangement being, like the whole air flow guide being decisive for the baking chamber 2, symmetrical relative to the vertical axis of the baking chamber 2, there result the same conditions for both directions of the baking air flowing through the baking chamber 2 in alternating direction.

The vapor supply means 15 arranged within the return channel 31 is located at the level of the baking chamber 2 and has a flat plate 37 being arranged in parallel relation to the adjacent partition 11 and having at its side facing this partition several chutes 38 assuming inclined position and consisting of rails welded to the plate 37 and being alternately inclined in forward and rearward direction, respectively (FIG. 2). If steam is needed in the baking atmosphere, water is supplied onto the topmost chute 38 through a tube 39 via a solenoid valve 40, noting that the water flows along each chute 31 until its lower end and drops from this location on the chute 38 located below. On account of the water flowing along the plate 37 along a meandering path, the water has ample time for becoming evaporated. The plate 37 forms an evaporater plate which, together with the chutes 38, forms a relatively great mass being heated during the heating stage. This is effected, on the one hand, by the hot air of the baking oven flowing around the plate 37 at its both sides and, on the other hand, by the heat of the flue gases which are guided along the plate 37 within a flue gas channel 41 (FIGS. 1, 2). This flue gas channel extends, starting from the flame tube 18, along a meandering line at the side of the plate 37 being averted from the partition 11 and in contact with this plate and leads to a flue gas exhaust opening 42 located at the level of the lowermost location of the vapor supply means 15 and allowing the flue gases to flow into an exhaust channel 43 arranged at the rear wall of the baking oven and being connected to the chimney. The mentioned meandering shape of the flue gas channel 41 is formed by horizontal transverse walls 44, arranged within this channel and not extending over the whole width of the flue gas channel 41.

Figure 5:
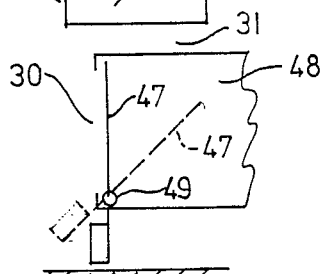
FIG. 5 shows in an enlarged scale a detail of FIG. 1.

Within the area of negative pressure of the blower 14, there is located in the housing 1 an opening 45 which can be tightly closed by a lid 46. If it is intended to remove the steam from the baking oven, this lid 46 is lifted by a lifting magnet not shown, so that the opening 45 is cleared. The steam or the warm air is expelled from the baking chamber 2 by the entering fresh air. Under the action of the positive pressure being thus generated within the baking chamber 2, a closure member 47 (FIGS. 1, 5) being formed of a weight-loaded steam overpressure flap being swivelable around a horizontal axis 49, is opened and thus brought into the open position shown in dashed lines in FIG. 5. The closure member 47 is arranged at the entrance of a channel 48 which is branched off the return channel 31 already within the suction opening 30 and which opens into the flue gas channel 41 and this at a location which is, as much as possible, located far away of the flue gas discharge opening 42. In FIG. 2, there can be seen that this entrance location is located within the area of the front wall of the oven, whereas the flue gas discharge opening 42 is arranged in the rear wall of the oven. Steam expelled from the baking chamber 2 thus flows via the weight-loaded closure member 47 along part of the vapor supply means 15 and along same and finally becomes mixed with the flue gas coming from the flame tube 18, whereupon this flue gas is, together with the steam, fed into the chimney via the flue gas discharge opening 42. The advantage of this system consists in that the very wet steam is dried by the flue gas and, above all, by the hot walls of the vapor supply means 15, so that incrustation of the chimney is prevented.

The air deflecting flap 27 and its actuating device, respectively, are designed such that this flap 27 can be fixed in a vertical intermediate position. The air supplied by the blower 14 then flows at both sides of the flap 27 in equal amounts into both channels 12 via both air supply channels 24. This has as an effect that both partitions 11 may be maintained in a uniform heated condition also if the door 3 is in open position.

What is claimed:

1. A baking oven comprising a housing having a baking chamber, first and second side air channels, and a hot air channel therein, a cover wall having an upper and lower sides, a lower side of said cover wall defining and substantially closing the upper extremity of said baking chamber, first and second side partitions in said housing defining opposite sides of said baking chamber, said first and second side partitions substantially separating said first and second side air channels, respectively, from said baking chamber and each having a plurality of air openings therein, said side partitions extending upwardly to said cover wall, carriage means removably received in said baking chamber for supporting goods to be baked therein, blower means disposed at least partially above said baking chamber and directly connected to said hot air channel, said blower means being operative for withdrawing air from said baking chamber and blowing it directly into said blower hot air channel, heater means disposed at least partially above said baking chamber and operative for heating the air withdrawn from said baking chamber before it enters said blower means, means for humidifying the air withdrawn from said baking chamber, said hot air channel extending across the upper side of said cover wall and communicating with said side air channels, switch means disposed in a central portion of said hot air channel above the upper said of the central portion of said cover wall for directing air from said blower means so that it alternatively passes into said baking chamber through said first side air channel or through said second side air channel.

2. In the baking oven of claim 1, said hot air channel extending downwardly from said blower means toward said cover wall, the sectional area of said hot air channel increasing in the extent of said hot air channel toward said cover wall, said switch means being located in the area of said hot air channel extending downwardly from said blower means having the greatest cross-sectional area.

3. In the baking oven of claim 1, said switch means comprising an air deflection flap which is pivotable about a horizontal axis which is substantially parallel to said side partitions.

4. In the baking oven of claim 3, said air deflection flap being trapezoidal and being pivotable about the base edge thereof.

5. In the baking oven of claim 1, said hot ain channel including first and second air supply channel portions which communicate with said first and second side air channels, respectively, for supplying air thereto, the widths of said first and second air supply channel portions increasing in the extents thereof toward said first and second side air channels, respectively.

6. In the baking oven of claim 5, the heights of said first and second air supply channels decreasing in the extents thereof toward said first and second side air channels, respectively.

7. The baking oven of claim 1 further comprising first and second redirecting means for redirecting air downwardly as it passes into said first or second side air channels, respectively.

8. In the baking oven of claim 7, said first and second means for redirecting air downwardly each comprising a plurality of upright substantially parallel lamellae which are disposed substantially parallel to the flow of air past said redirecting means.

9. In the baking oven of claim 8, said hot air channel including first and second air supply channel portions which communicate with said first and second side air channels, respectively, for supplying air thereto, said baking oven further comprising first and second air supply channel bottom walls which define the lower extremities of said first and second air supply channels, respectively, and first and second tubular support means for supporting said first and second air supply channel bottom walls so that they are inclined upwardly in their extents toward said first and second side air channels, said tubular support means being substantially parallel to said partitions and also supporting the lamellae of said first and second redirecting means, respectively.

10. In the baking oven of claim 1, said housing having an air return channel formed therein, said air return channel extending sequentially from the lower portion of said baking chamber to said vapor supply means to said heater means and then to said blower means.

11. In the baking oven of claim 1, said blower means being disposed above said, baking chamber and including a blower having a rotor, said rotor having a substantially horizontal axis of rotation which is substantially parallel to said partitions.

12. In the baking oven of claim 11, said blower means further comprises a substantially spiral-shaped mantle for directing air from said rotor into the blower air hot channel in a direction toward said baking chamber.

13. In the baking oven of claim 1, said hot air channel being directed toward said baking chamber and including first and second air supply channel portions which communicate with said first and second side air channels, respectively, said first and second side air channels being symetrically oriented with respect to said baking chamber.

14. The baking oven of claim 1, further comprising a pressure tube extending from said blower means toward said baking chamber, said pressure tube defining at least a portion of said hot air channel.

* * * * *